US012606051B2

(12) United States Patent
Kobashi

(10) Patent No.: US 12,606,051 B2
(45) Date of Patent: Apr. 21, 2026

(54) CHARGING MANAGEMENT APPARATUS, NAVIGATION SYSTEM, AND NON-TRANSITORY RECORDING MEDIUM

(71) Applicant: SUBARU CORPORATION, Tokyo (JP)

(72) Inventor: Kento Kobashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 305 days.

(21) Appl. No.: 18/297,231

(22) Filed: Apr. 7, 2023

(65) Prior Publication Data

US 2023/0339360 A1 Oct. 26, 2023

(30) Foreign Application Priority Data

Apr. 22, 2022 (JP) ................................. 2022-070481

(51) Int. Cl.
B60L 58/12 (2019.01)
G01C 21/36 (2006.01)

(52) U.S. Cl.
CPC .......... B60L 58/12 (2019.02); G01C 21/3679 (2013.01); B60L 2240/62 (2013.01)

(58) Field of Classification Search
CPC .......... B60L 58/12; B60L 53/62; B60L 53/66; B60L 2240/72; G01C 21/3679; Y02T 90/12
See application file for complete search history.

(56) References Cited

U.S. PATENT DOCUMENTS 12,146,753 B2 * 11/2024 Erozlu .................... B60L 58/12
2013/0261953 A1 10/2013 Kiyama et al.

(Continued)

FOREIGN PATENT DOCUMENTS

JP 2003-262525 A 9/2003
JP 2013-015424 A 1/2013

(Continued)

OTHER PUBLICATIONS

George M. Sammonds, Neil J. Mansfield, Mike Fray, Improving long term driving comfort by taking breaks—How break activity affects effectiveness, Applied Ergonomics, vol. 65, pp. 81-89, https://doi.org/10.1016/j.apergo.2017.05.008. (Year: 2017).*
Notice of Reasons for Refusal received in corresponding Japanese Patent Application No. 2022-070481, dated Dec. 9, 2025.

*Primary Examiner* — Scott A Browne
*Assistant Examiner* — Josephine Elizabeth Rich
(74) *Attorney, Agent, or Firm* — Rimon P.C.

(57) ABSTRACT

A charging management apparatus is configured to manage charging of a battery of an electric vehicle serving as a vehicle. The charging management apparatus includes one or more processors and one or more memories. The one or more memories are communicably coupled to the one or more processors. The one or more processors are configured to: acquire data on a current location and a destination of the vehicle; set charging facilities of the battery to stop during a travel from the current location to the destination, based on a predetermined criterion; and calculate a necessary charging time necessary at a first charging facility of the charging facilities to cause an expected remaining capacity of the battery upon a scheduled arrival at a second charging facility of the charging facilities after the first charging facility to be equal to or greater than a predetermined reference charging capacity.

6 Claims, 5 Drawing Sheets

(56)      References Cited

U.S. PATENT DOCUMENTS

| | | | | |
|---|---|---|---|---|
| 2014/0156108 A1* | 6/2014 | Reich | ................ | G01C 21/3469 |
| | | | | 701/1 |
| 2015/0367740 A1* | 12/2015 | Mcgrath | ............... | G06Q 50/06 |
| | | | | 320/137 |
| 2020/0011687 A1* | 1/2020 | Lindemann | ........ | G01C 21/3469 |
| 2020/0094698 A1 | 3/2020 | Imai | | |
| 2022/0320872 A1* | 10/2022 | Jiang | ...................... | H02J 7/007 |
| 2023/0038012 A1* | 2/2023 | Erozlu | .............. | G01C 21/3679 |

FOREIGN PATENT DOCUMENTS

| | | | |
|---|---|---|---|
| JP | 2013-210281 | A | 10/2013 |
| JP | 2019-095311 | A | 6/2019 |
| JP | 2020-027023 | A | 2/2020 |
| JP | 2020-051786 | A | 4/2020 |
| JP | 2021-009108 | A | 1/2021 |

* cited by examiner

CHARGING MANAGEMENT APPARATUS, NAVIGATION SYSTEM, AND NON-TRANSITORY RECORDING MEDIUM

CROSS-REFERENCE TO RELATED APPLICATIONS

The present application claims priority from Japanese Patent Application No. 2022-070481 filed on Apr. 22, 2022, the entire contents of which are hereby incorporated by reference.

BACKGROUND

The disclosure relates to a charging management apparatus, a navigation system, and a non-transitory recording medium that manage charging of a battery of an electric vehicle.

An electric vehicle is unable to travel when electric power charged in a battery is exhausted. Accordingly, it is necessary to charge the electric vehicle before a remaining amount of the battery runs out. For this reason, various techniques that propose a charging facility of the battery to a user have been disclosed.

For example, Japanese Unexamined Patent Application Publication (JP-A) No. 2021-9108 discloses a navigation apparatus that searches for multiple charging facilities having a charger that allows for charging of a battery, and estimates a temperature of the battery and a remaining amount of the battery at the time of arrival at each of the charging facilities included in the multiple charging facilities. The navigation apparatus identifies an allowable current at the time of charging corresponding to the temperature, estimates the charging time based on the allowable current and the remaining amount of the battery, and displays the expected arrival time and the charging time for each of the charging facilities.

JP-A No. 2003-262525 discloses a charging station information providing apparatus that extracts a charging facility existing around a current location of an electric vehicle from stored charging facilities, and provides a position of the extracted charging facility and information on availability of a charger provided in the charging facility.

SUMMARY

An aspect of the disclosure provides a charging management apparatus configured to manage charging of a battery of an electric vehicle serving as a vehicle. The charging management apparatus includes one or more processors and one or more memories. The one or more memories are communicably coupled to the one or more processors. The one or more processors are configured to: acquire data on a current location and a destination of the vehicle; set charging facilities of the battery to stop during a travel from the current location to the destination, based on a predetermined criterion; and calculate a necessary charging time necessary at a first charging facility of the charging facilities to cause an expected remaining capacity of the battery upon a scheduled arrival at a second charging facility of the charging facilities that is to be stopped after the first charging facility to be equal to or greater than a predetermined reference charging capacity.

An aspect of the disclosure provides a navigation system to be applied to an electric vehicle serving as a vehicle. The navigation system includes one or more processors and one or more memories. The one or more processors are communicably coupled to the one or more processors. The one or more processors are configured to: acquire data on a current location and a destination of the vehicle; set charging facilities of the battery to stop during a travel from the current location to the destination, based on a predetermined criterion; calculate a necessary charging time necessary at a first charging facility of the charging facilities to cause an expected remaining capacity of the battery upon a scheduled arrival at a second charging facility of the charging facilities that is to be stopped after the first charging facility to be equal to or greater than a predetermined reference charging capacity; and present a staying time at the first charging facility.

An aspect of the disclosure provides a non-transitory computer readable recording medium containing a computer program to be applied to a charging management apparatus. The charging management apparatus is configured to manage charging of a battery of an electric vehicle serving as a vehicle. The computer program causes, when executed by one or more processors, the one or more processors to implement a method. The method includes: acquiring data on a current location and a destination of the vehicle; setting charging facilities of the battery to stop during a travel from the current location to the destination, based on a predetermined criterion; and calculating a necessary charging time necessary at a first charging facility of the charging facilities to cause an expected remaining capacity of the battery upon a scheduled arrival at a second charging facility of the charging facilities that is to be stopped after the first charging facility to be equal to or greater than a predetermined reference charging capacity.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
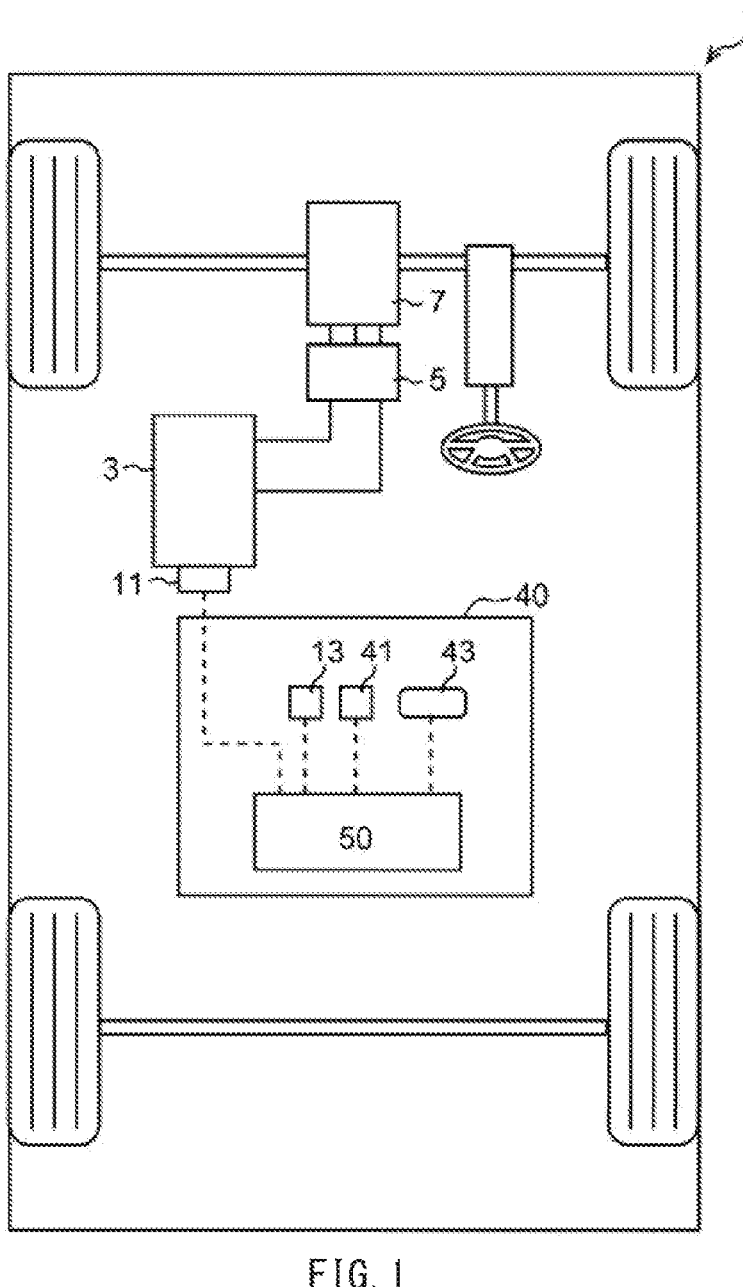
FIG. 1 is a schematic diagram illustrating an example of a configuration of a vehicle including a charging management apparatus or a controller according to one example embodiment of the disclosure.

Techniques disclosed in JP-A Nos. 2021-9108 and 2003-262525 each provide a user with information such as a position of each charging facility or the charging time for a charging facility to stop, but do not provide information that further takes into consideration the necessary electric power that allows a vehicle to reach the next charging facility. For example, the techniques disclosed in JP-A Nos. 2021-9108 and 2003-262525 necessitate the user to select, each time, a charging facility when the user goes to a predetermined destination by an electric vehicle, which can cause the user to feel cumbersomeness. In addition, when the necessary electric power that allows the vehicle to reach the next charging facility is not taken into consideration, it is necessary to perform charging until a battery is fully charged every time in each charging facility, which can make the staying time at the charging facility unnecessarily long.

It is desirable to provide a charging management apparatus, a navigation system, and a non-transitory recording medium that make it possible to propose, upon setting a route to a destination, a charging plan that takes into consideration battery charging facilities to stop along the way and the staying time at each of the charging facilities.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<1. System Configuration>

First, an example of a system configuration of a vehicle including a charging management apparatus according to an example embodiment of the disclosure will be described. In the example embodiment, the "controller 50" may serve as the charging management apparatus. The "controller 50" may serve as a controller of a navigation system 40 together with capabilities as the charging management apparatus.

FIG. 1 is a schematic diagram illustrating an example of a configuration of a vehicle 1 including the charging management apparatus according to the example embodiment. The vehicle 1 may be a front-wheel-driven electric vehicle that drives front wheels by a drive torque outputted from a drive motor 7 that generates a drive torque of the vehicle 1. In some embodiments, the vehicle 1 may be an electric vehicle including two driving motors, e.g., a front wheel driving motor and a rear wheel driving motor. In some embodiments, the vehicle 1 may be an electric vehicle including driving motors corresponding to respective wheels.

The drive motor 7 may be a three-phase AC motor, but a type of the drive motor 7 is not particularly limited. The vehicle 1 may include a battery unit 3 and an inverter unit 5, as a system that drives the drive motor 7. The battery unit 3 may include battery cells that store electric power to be supplied to the drive motor 7. The battery unit 3 may include a battery management device 11. The battery management device 11 may acquire data such as an open voltage, an output voltage, an output current, a state of charge (SOC), or a temperature of the battery unit 3, and may transmit the data to the controller 50. When the battery unit 3 includes a cooling device such as a blower fan, the battery management device 11 may control driving of the cooling device.

The inverter unit 5 may convert a DC current supplied from the battery unit 3 into a three-phase AC current and supply the three-phase AC current to the drive motor 7. The inverter unit 5 may convert an AC current generated by regeneration of the drive motor 7 at the time of deceleration of the vehicle 1 into a DC current, and supply the DC current to the battery unit 3. The inverter unit 5 may include a DC-DC converter that increases or decreases a voltage. The inverter unit 5 may be driven and controlled by an unillustrated motor controller, based on a request drive torque or a request regenerative brake torque of the vehicle 1.

<2. Navigation System>

Figure 2:
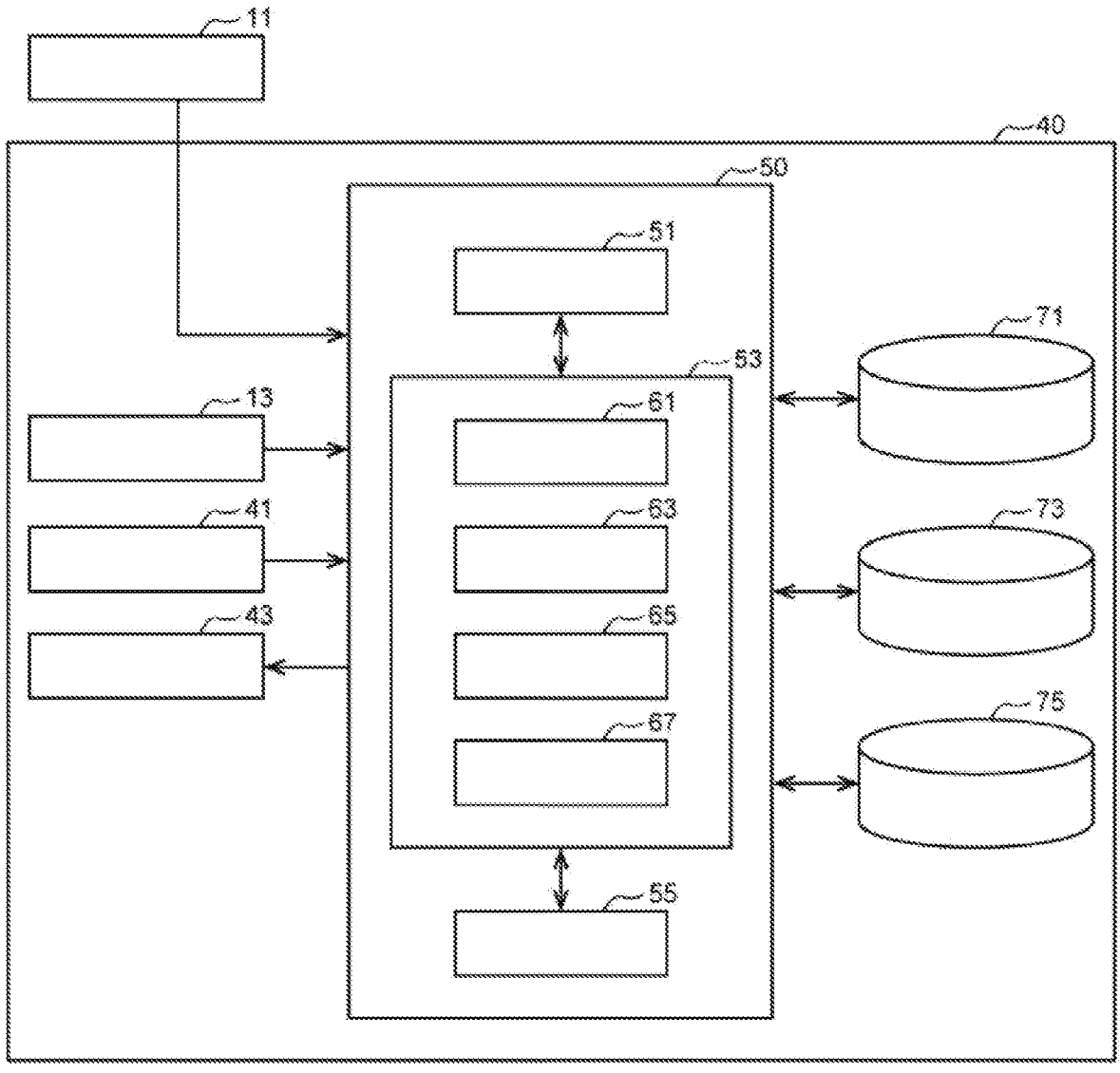
FIG. 2 is a block diagram illustrating a configuration of a navigation system according to one example embodiment.

Next, an example of a configuration of the navigation system 40 will be described with reference to FIG. 1 and FIG. 2. FIG. 2 is a block diagram illustrating a configuration of the navigation system 40.

The navigation system 40 may include a GNSS (Global Navigation Satellite System) sensor 13, an input unit 41, an output unit 43, the controller 50, a map database 71, a charging facility database 73, and a travel database 75.

The GNSS sensor 13 may receive satellite signals transmitted from satellites such as GPS (Global Positioning System) satellites. The GNSS sensor 13 may output position data of the vehicle 1 included in the received satellite signals to the controller 50. The GNSS sensor 13 may include, besides the GPS satellites, an antenna that receives a satellite signal from any other satellite system that identifies a position of the vehicle 1.

The input unit 41 may receive an input for a user to operate the navigation system 40. The input unit 41 may include, for example, one or more of a touch panel, a dial switch, a switch button, and an operation lever. The input unit 41 may receive an input based on voice or a gesture. The input unit 41 may be a portable terminal to be used by the user.

The output unit 43 may present various kinds of information to the user by a method such as image display or audio output. The output unit 43 may include, for example, a display device and a speaker provided in an instrument panel. The output unit 43 may be provided with HUD (a head-up display) that performs displaying on a windshield, or may be provided with a portable terminal to be used by the user. The input unit 41 and the output unit 43 may be an integrated device.

The map database 71 may contain map data including, for example, road data, data on buildings, facility data, data on installation positions of traffic signals, and terrain data.

The charging facility database 73 may contain a position on the map data of a charging facility directed to charging of the battery unit 3 of the vehicle 1. The charging facility database 73 may further contain detailed data such as the number of charging devices of each of the charging facilities.

The travel database 75 may contain data on an electric power consumption amount upon traveling of multiple other vehicles. The travel database 75 may contain, for each predetermined section such as a section on a predetermined distance basis, a section between traffic signals, a section between intersections, or a section between interchanges, the electric power consumption amount upon traveling each section, in association with a vehicle type or vehicle specifications. The vehicle type or the vehicle specifications may be factors that influence performance of an electric power consumption rate, and include data such as a rated output of the drive motor, a rated output of the battery unit, or a vehicle weight.

The GNSS sensor 13, the input unit 41, and the output unit 43 may be communicably coupled to the controller 50 via a communication element such as a dedicated line, CAN (Controller Area Network), or LIN (Local Inter Net). The GNSS sensor 13, the input unit 41, and the output unit 43 may be coupled via a wireless communication method such as Bluetooth (Registered Trademark) or NFC (Near Field Communication).

The map database 71, the charging facility database 73, and the travel database 75 each may be mounted on the vehicle 1, and may be communicably coupled to the controller 50 via a communication bus such as a dedicated line, CAN or LIN, or a wireless communication method such as Bluetooth (Registered Trademark) or NFC. Alternatively, the map database 71, the charging facility database 73, and the travel database 75 each may be provided in an external server communicably coupled to the controller 50 via a mobile communication method. The pieces of data stored in the map database 71, the charging facility database 73, and the travel database 75 each may be updated constantly or at any update time.

The controller 50 may serve as a device that manages the charging of the battery unit 3 and a device that controls the navigation system when a processor such as one or more CPUs (Central Processing Unit) execute a computer program. The computer program may cause the processor to execute a later-described operation to be executed by the controller 50. The computer program to be executed by the processor may be recorded in a non-transitory recording medium that serves as a storage (or a memory) 55 provided in the controller 50. In some embodiments, the computer program may be recorded in a non-transitory recording medium built in the controller 50 or any non-transitory recording medium externally attachable to the controller 50.

The non-transitory recording medium that records the computer program may be: a magnetic medium such as a hard disk, a floppy disk, or a magnetic tape; an optical recording medium such as CD-ROM (Compact Disk Read Only Memory), DVD (Digital Versatile Disk), or Blu-ray (Registered Trademark); a magneto-optical medium such as a floptical disk; a storage device such as RAM (Random Access Memory) or ROM (Read Only Memory); a flash memory such as USB (Universal Serial Bus) or SSD (Solid State Drive); or any other medium that allows for storing of a program.

It should be noted that the controller 50 is not limited to an electronic control device mounted on the vehicle 1. In some embodiments, the controller 50 may be a portable terminal device such as a smartphone or a wearable device.

<3. Controller (Charging Management Apparatus)>

Next, a configuration of the controller 50 according to the example embodiment will be described in detail.

In the following example embodiment, an amount of electric power, or an amount of electric power such as a charging capacity or a remaining capacity, may be calculated based on conversion of the amount of electric power into a rate (unit: %) of the charging capacity of the battery unit 3, where a maximum value of the charging capacity of the battery unit 3 is 100%.

The controller 50 may include a communicator 51, a processing unit 53, and a storage 55. The communicator 51 may be an interface for an external communication that is communicably coupled to the processing unit 53. The communicator 51 may be used for communication with a device such as the map database 71, the charging facility database 73, the travel database 75, or the battery management device 11. The processing unit 53 may be or may include one or more processors. All or a part of the processing unit 53 may be configured to be updatable by firmware, for example. All or a part of the processing unit 53 may be, for example, a program module executed by a command from a device such as CPU. The storage 55 may be or may include one or more memories such as RAM or ROM, and may be communicably coupled to the processing unit 53. It should be noted that the number and type of the storage 55 are not particularly limited. The storage 55 may hold the computer program to be executed by the processing unit 53 and data such as various parameters, detection data, or a calculation result to be used for arithmetic processing.

The processing unit 53 may include a route setting unit 61, a power consumption estimation unit 63, a charging time calculation unit 65, and a notification control unit 67. All or a part of those units may be achieved as a result of execution of the computer program by the processor. In some embodiments, a part of each unit may include an analog circuit. Hereinafter, an operation of each unit will be briefly described, and a process operation of the processing unit 53 will be described in detail.

(Route Setting Unit)

The route setting unit 61 may acquire data on the destination designated by the user, acquire data on a current location of the vehicle 1 based on the position data outputted from the GNSS sensor 13, and set at least one candidate of a traveling route from the current location to the destination. The route setting unit 61 may so set at least one traveling route candidate as to allow for a brief stop at charging facilities during a travel from the current location to the destination, based on a predetermined criterion. For example, the predetermined criterion may be stopping at the charging facility at each predetermined time, stopping at the charging facility at each predetermined distance, stopping at the charging facility at each municipality to pass, or may be set based on any other criterion. The predetermined criterion may be determined in advance, may be configured to be set by the user to any criterion, or may be selectable by the user from among multiple options.

(Power Consumption Estimation Unit)

The power consumption estimation unit 63 may estimate an expected power consumption amount E_est when the vehicle 1 travels on a route scheduled to travel. In the example embodiment, the power consumption estimation unit 63 may estimate the expected power consumption amount E_est by referring to the travel database 75 and extracting traveling data of a vehicle of a vehicle type whose performance of the electric power consumption rate belongs to the same classification as that of the vehicle 1. For example, the power consumption estimation unit 63 may estimate the expected power consumption amount E_est by extracting data on power consumption upon traveling in each section of the route scheduled to travel, from among pieces of traveling data of vehicles of a vehicle type in which a vehicle weight, a rated output of a drive motor, and a rated output of a battery unit are classified as approximately the same as those of the vehicle 1. The power consumption estimation unit 63 may estimate the expected power consumption amount E_est for each section between the charging facilities of the traveling route selected by the user, among the candidates of the traveling routes set by the route setting unit 61.

(Charging Time Calculation Unit)

The charging time calculation unit 65 may so calculate, when the vehicle 1 stops at a relevant charging facility (hereinafter, also referred to as a "brief stop facility"), a necessary charging time T_chg at the relevant charging facility that an expected remaining capacity E_c of the battery unit 3 at the time of scheduled arrival at a next charging facility (hereinafter, also referred to as a "brief stop scheduled facility") becomes equal to or greater than a predetermined reference charging capacity E_min. The reference charging capacity E_min may be set to, for example, 20%, in consideration of degradation of the battery cells of the battery unit 3. In some embodiments, the reference charging capacity E_min may be set to any other value, or may be configured to be changeable to any value by the user.

The expected remaining capacity E_c of the battery unit 3 at the time of the scheduled arrival at the brief stop scheduled facility may be determined by subtracting the expected power consumption amount E_est upon traveling on the route from the brief stop facility to the brief stop scheduled facility, from the remaining capacity E_b at the time of departure from the brief stop facility.

$$E\_c=E\_b-E\_est$$

The remaining capacity E_b of the battery unit 3 necessary for the departure from the brief stop facility may be determined by adding, to the reference charging capacity E_min, the expected power consumption amount E_est upon traveling on the route from the brief stop facility to the brief stop scheduled facility.

$$E\_b=E\_min+E\_est$$

A difference between the remaining capacity E_b of the battery unit 3 upon the departure from the brief stop facility and the remaining capacity E_a of the battery unit 3 upon starting the charging at the brief stop facility may be a necessary charging power amount E_chg necessary at the brief stop facility.

$$E\_chg=E\_b-E\_a$$

The charging time calculation unit 65 may calculate the necessary charging time T_chg necessary for performing charging for the necessary charging power amount E_chg, based on data on a charging efficiency previously recorded in the storage 55 in accordance with specification of the battery unit 3 of the vehicle 1. A rated output of a charging device provided in each charging facility is set in advance by a unified standard. Accordingly, determining the remaining capacity E_a of the battery unit 3 at the start of the charging and the remaining capacity E_b of the battery unit 3 at the end of the charging makes it possible to calculate the necessary charging time T_chg.

Figure 3:
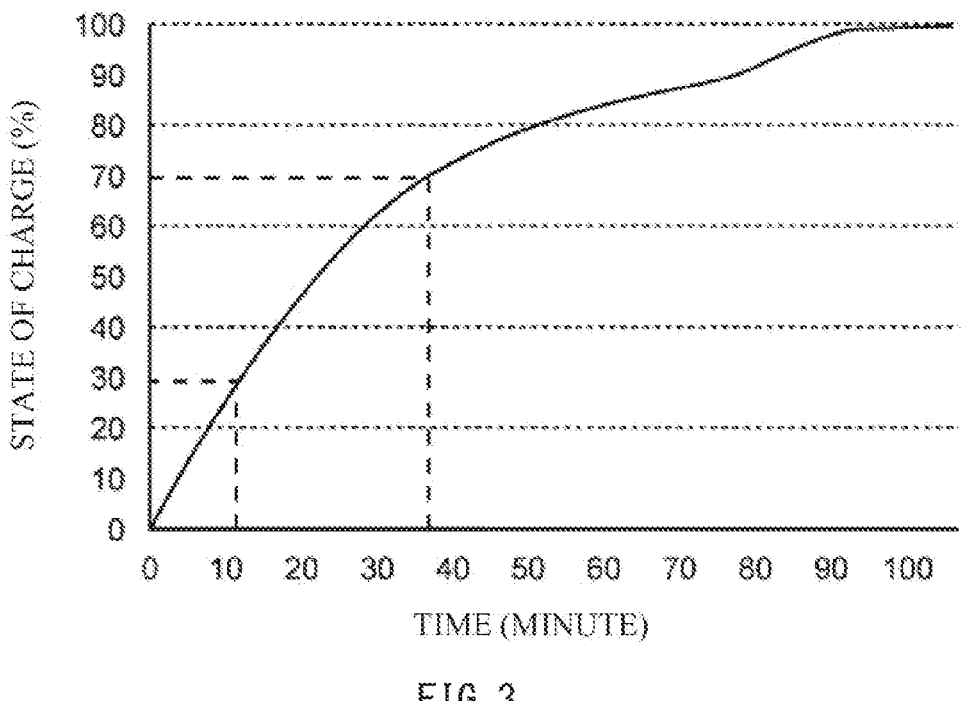
FIG. 3 is an explanatory diagram illustrating an example of charging efficiency data.

FIG. 3 illustrates an example of the charging efficiency data.

FIG. 3 illustrates a time necessary for charging to a state of full charge (100%) by using a charging facility, from the start of the charging where the remaining capacity of the battery unit 3 is 0%. For example, when the charging is to be performed from a state where the remaining capacity is 30% to a state where the remaining capacity is 70%, the necessary charging time T_chg is about 25 minutes.

In this way, the charging time calculation unit 65 may calculate the necessary charging time T_chg at the brief stop facility, based on the remaining capacity E_a of the battery unit 3 at the time of the start of the charging at the brief stop facility and the remaining capacity E_b of the battery unit 3 at the time of the end of the charging. For example, as the remaining capacity E_a of the battery unit 3 at the time of the start of the charging, a value of the remaining capacity at the time of arrival at the brief stop facility may be used, or an estimated value of the remaining capacity at the time of the arrival at the brief stop facility estimated before the arrival at the brief stop facility may be used. In one example, the charging time calculation unit 65 may determine, before the arrival at the brief stop facility, a power consumption amount upon traveling in a section from a current location of the vehicle 1 to the brief stop facility which is at any time before the arrival at the brief stop facility by referring to, for example, the travel database 75, and may set a value in which the power consumption amount is subtracted from the remaining capacity of the battery unit 3 and which is at any time before the arrival at the brief stop facility as the remaining capacity E_a of the battery unit 3 at the time of the start of the charging.

(Notification Control Unit)

The notification control unit 67 may control and drive the output unit 43 to notify the user of various pieces of information. For example, the notification control unit 67 may display, on the map data, the candidates of the traveling route to the destination set by the route setting unit 61. The notification control unit 67 may display the traveling route selected by the user on the map data, and may also display position information of the vehicle 1 acquired from the GNSS sensor 13 on the map data.

The notification control unit 67 may display, on the map data, information on charging facilities to stop on the traveling route to the destination, and may notify the staying time at a charging facility upon making a brief stop at the charging facility. The notification control unit 67 may propose the necessary charging time T_chg as the staying time. The notification control unit 67 may notify the user of the staying time by a display notification, a voice notification, or both. In the example embodiment, the notification control unit 67 may so set the staying time as to cause the staying time to be equal to or longer than a predetermined minimum rest time. For example, when the necessary charging time T_chg is shorter than the minimum rest time, the notification control unit 67 may propose the minimum rest time as the staying time. This helps to recover the fatigue of the user who rides on the vehicle 1 for a long time and allow the user to utilize the vehicle 1 comfortably.

<4. Operation of Controller (Charging Management Apparatus)>

Next, an example of an operation of the controller 50 according to the example embodiment will be described in detail with reference to a flowchart.

Figure 4:
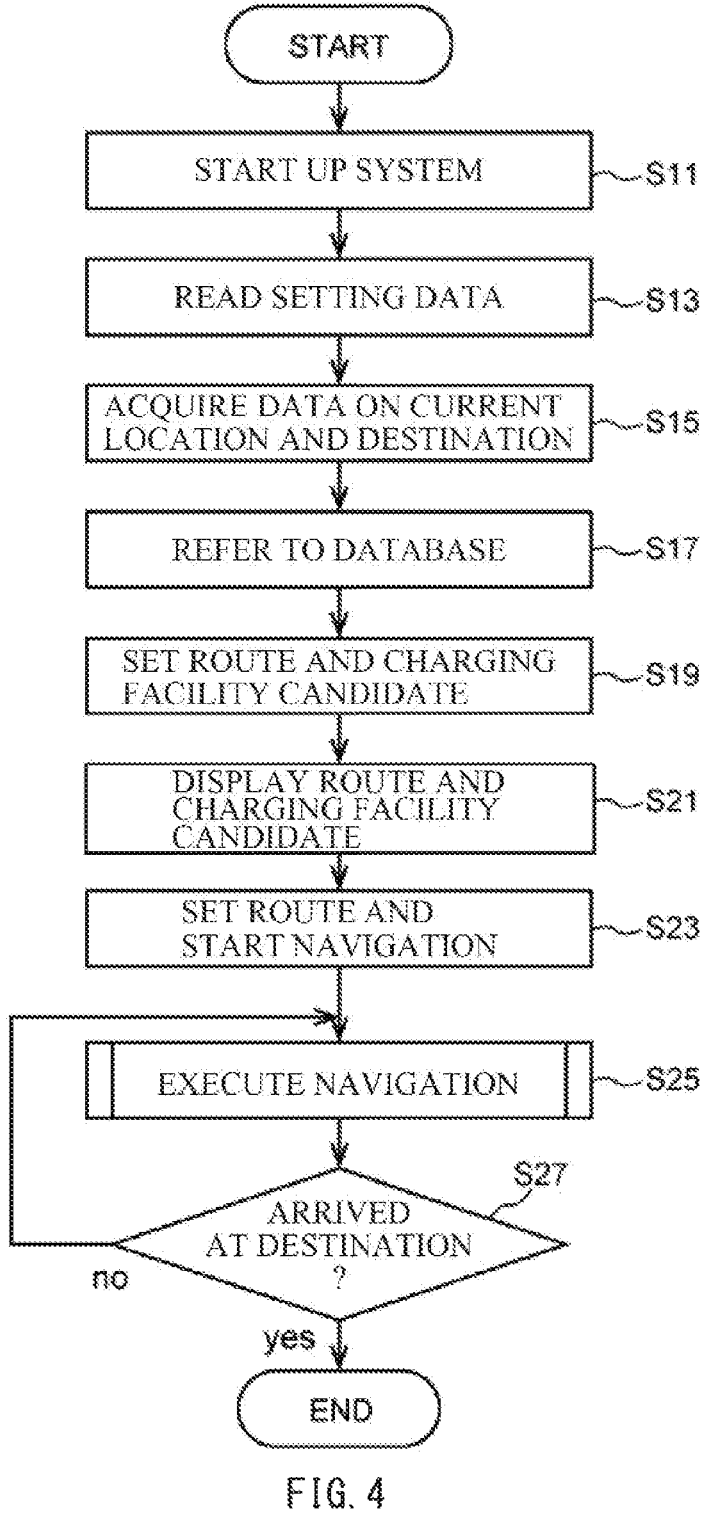
FIG. 4 is a flowchart illustrating a routine of a process operation to be performed by the controller of the one example embodiment.

FIG. 4 is a flowchart illustrating a routine of a process operation of the controller 50 according to the example embodiment. First, when the navigation system 40 is started up (step S11), the processing unit 53 may read setting data of a system (step S13). For example, the processing unit 53 may read reference data on the charging facilities to stop during the travel to the destination, data on the minimum rest time, and data on the performance of the electric power consumption rate of the vehicle 1, which may be set in advance or may be set by the user and stored in the storage 55.

Thereafter, the route setting unit 61 of the processing unit 53 may acquire data on a current location of the vehicle 1 based on the position data outputted from the GNSS sensor 13, and acquire data on the destination set by the user (step S15).

Thereafter, the route setting unit 61 may refer to the map database 71 and the charging facility database 73, and extract road data and data on the charging facilities from the current location to the destination (step S17).

Thereafter, the route setting unit 61 may so set at least one traveling route candidate as to allow for a brief stop at the charging facilities during the travel from the current location to the destination, based on the predetermined criterion (step S19). For example, on the assumption that the vehicle 1 is to travel each road at a legal speed, the route setting unit 61 may determine, for example, a candidate of the traveling route that allows for making of the brief stop at the charging facility approximately every one hour, based on a traveling time obtained by dividing a length of each section by the legal speed. For the route that allows for the brief stop at the charging facilities based on the predetermined criterion, multiple traveling route candidates may be set, such as a route that prioritizes a general road, a route that prioritizes a toll road, a route based on a shortest distance, or a route that avoids a narrow road. When a part of the charging facilities fails to satisfy the criterion upon setting the charging facilities that satisfy the criterion, a charging facility that is as close to the criterion as possible may be set.

Thereafter, the notification control unit 67 may control and drive the output unit 43 to display at least one traveling route candidate set by the route setting unit 61 (step S21). Accordingly, the user may select a one of the traveling routes from the displayed traveling route candidates.

Thereafter, the route setting unit 61 may set the traveling route selected by the user via the input unit 41 as a traveling route to be used for the navigation, and set starting of a navigation process (step S23). Thus, the processing unit 53 may execute the navigation process (step S25).

Figure 5:
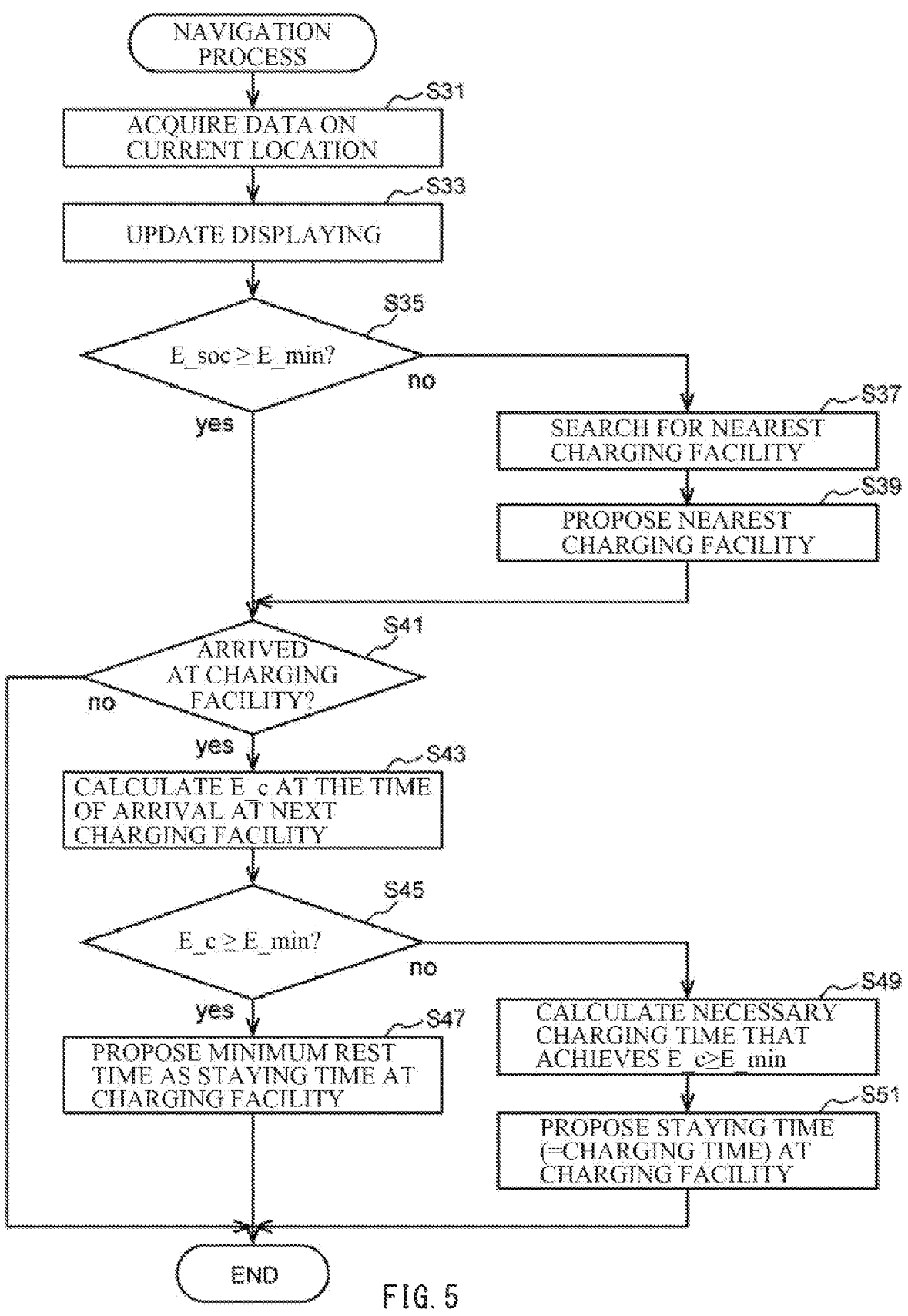
FIG. 5 is a flowchart illustrating a navigation process to be performed by the controller of the one example embodiment.

FIG. 5 illustrates a flowchart of the navigation process.

First, the notification control unit 67 may acquire data on the current location of the vehicle 1 based on the position data outputted from the GNSS sensor 13 (step S31). Thereafter, the notification control unit 67 may update displaying based on the data of the current location of the vehicle 1 (step S33). For example, the notification control unit 67 may so update the map data to be displayed as to cause the current location of the vehicle 1 to be positioned in the middle of a display region, and display a predetermined icon at the current location of the vehicle 1. Any of various known methods may be adopted as a display method of a navigation screen.

Thereafter, the charging time calculation unit 65 may read the charging capacity E_soc (%) of the battery unit 3 transmitted from the battery management device 11, and determine whether the charging capacity E_soc (%) is equal to or greater than the reference charging capacity E_min (%) (step S35). If the charging capacity E_soc (%) is not equal to or greater than the reference charging capacity E_min (%) (step S35: No), the charging time calculation unit 65 may refer to the charging facility database 73 and search for the nearest charging facility from the current location of the vehicle 1 (step S37). For example, when the charging capacity E_soc (%) of the battery unit 3 is already lower than the reference charging capacity E_min (%), the charging of the battery unit 3 may be prioritized, and the nearest charging facility may be searched regardless of the set traveling route. Thereafter, the notification control unit 67 may control the driving of the output unit 43, and propose the user to stop at the nearest charging facility (step S39).

If the charging capacity E_soc (%) is equal to or greater than the reference charging capacity E_min (%) in step S35 (step S35: Yes) or if a proposal is made to the user to stop at the nearest charging facility in step S39, the charging time calculation unit 65 may thereafter determine whether the vehicle 1 has arrived at a charging facility (step S41). The charging time calculation unit 65 may determine that the vehicle 1 has arrived at the charging facility when the current location of the vehicle 1 is positioned at the charging facility, or may determine that the vehicle 1 has arrived at the charging facility when the current location of the vehicle 1 is positioned within, for example, a radius from 10 meters to 100 meters from the charging facility.

If the vehicle 1 has not arrived at the charging facility (step S41: No), the routine may exit and proceed to step S27 of FIG. 4 to determine whether the vehicle 1 has arrived at the destination (step S27). If the vehicle 1 has not arrived at the destination (step S27: No), the routine may return to step S25 to continue the navigation process illustrated in FIG. 5.

If the vehicle 1 has arrived at the charging facility (step S41: Yes), the charging time calculation unit 65 may calculate the expected remaining capacity E_c (%) of the battery unit 3 at the time of scheduled arrival at a charging facility scheduled to stop next (step S43). In step S43, the charging time calculation unit 65 may calculate the expected remaining capacity E_c (%) of the battery unit 3 at the time of the scheduled arrival at the brief stop scheduled facility, assuming that the vehicle 1 has traveled to the next charging facility (i.e., the brief stop scheduled facility) without performing the charging at a charging facility to stop this time (i.e., the brief stop facility).

For example, the charging time calculation unit 65 may refer to the travel database 75, and extract data on the electric power consumption amount that is when a vehicle whose performance of the electric power consumption rate belongs to the same classification as that of the vehicle 1 has traveled each section of the traveling route from the brief stop facility to the brief stop scheduled facility. The data on the electric power consumption amount may reflect, for example, an increase in a load upon traveling on an uphill slope, a decrease in a load upon traveling on a downhill slope, and a charging electric power upon use of a regenerative brake. The charging time calculation unit 65 may convert a value in which an average value of the electric power consumption amounts of respective sections is integrated into the charging capacity of the battery unit 3, and estimate the expected power consumption amount E_est (%) that is when the vehicle 1 has traveled from the brief stop facility to the brief stop scheduled facility. In some embodiments, a maximum value may be integrated instead of the average value of the electric power consumption amounts of the respective sections.

Thereafter, the charging time calculation unit 65 may calculate the expected remaining capacity E_c (%) of the battery unit 3 at the time of scheduled arrival at the brief stop scheduled facility, by subtracting the estimated expected power consumption amount E_est (%) from the current charging capacity E_soc (%) of the battery unit 3.

It should be noted that when a brief stop at a charging facility that is different from the charging facility on the traveling route originally set is made based on the proposal made in step S39, the charging time calculation unit 65 may set, among the charging facilities on the traveling route originally set, the nearest charging facility from the charging facility stopped this time as a charging facility scheduled to stop next, to calculate the expected remaining capacity E_c (%).

Thereafter, the charging time calculation unit 65 may determine whether the expected remaining capacity E_c (%) is equal to or greater than the reference charging capacity E_min (%) (step S45). In step S45, the charging time calculation unit 65 may determine whether the expected remaining capacity E_c (%) of the battery unit 3 at the time of arrival at the next charging facility does not become less than the reference charging capacity E_min (%) even when the charging is not to be performed at the charging facility that is to be stopped at this time. If the expected remaining capacity E_c (%) is equal to or greater than the reference charging capacity E_min (%) (step S45: Yes), although the necessity of performing the charging is low at the charging facility to stop at this time, the notification control unit 67 may drive the output unit 43 to propose the preset minimum rest time T_rest as the staying time (step S47), in consideration of a level of the fatigue of the occupant who rides on the vehicle 1 for a long time.

If the expected remaining capacity E_c (%) is not equal to or greater than the reference charging capacity E_min (%) (S45: No), the charging time calculation unit 65 may calculate the necessary charging time T_chg necessary at the current charging facility to cause the expected remaining capacity E_c (%) of the battery unit 3 at the time of the scheduled arrival at the charging facility to stop next to become equal to or greater than the reference charging capacity E_min (%) (step S49). For example, the charging time calculation unit 65 may add the expected power consumption amount E_est (%) calculated in step S43 to the reference charging capacity E_min (%) to thereby calculate the remaining capacity E_b of the battery unit 3 necessary for departing the current charging facility.

In addition, the charging time calculation unit 65 may calculate the necessary charging power amount E_chg (%) by subtracting the current remaining capacity of the battery unit 3 (i.e., the remaining capacity of the battery unit 3 upon starting the charging) E_a (%) from the calculated remaining capacity E_b (%). Further, the charging time calculation unit 65 may calculate the necessary charging time T_chg necessary to achieve the remaining capacity E_b (%) of the battery unit 3 at the time of the end of the charging from the remaining capacity E_a (%) of the battery unit 3 at the time of the start of the charging, based on the charging efficiency data illustrated in FIG. 3.

Thereafter, the notification control unit 67 may drive the output unit 43 to propose the calculated necessary charging time T_chg as the staying time (step S51). After the notification control unit 67 has proposed the staying time in step S47 or step S51, the routine may exit and proceed to step S27 of FIG. 4 to determine whether the vehicle 1 has arrived at the destination (step S27). If the vehicle 1 has not arrived at the destination (step S27: No), the routine may return to step S25 to continue the navigation process illustrated in FIG. 5. If the vehicle 1 has arrived at the destination (step S27: Yes), the processing unit 53 may end the series of process operations.

Allowing the user to charge the battery unit 3 at each charging facility based the proposed staying time helps to reach the destination with consumption of the minimum staying time, while suppressing overcharge or overdischarge of the battery unit 3 and preventing deterioration of the battery cells. It should be noted that the user may take a longer break than the proposed staying time.

The controller 50 according to the example embodiment sets the charging facilities of the battery unit 3 to stop during the travel from the current location to the destination based on the predetermined criterion, and calculates the necessary charging time T_chg necessary at each of the charging facilities to stop to cause the expected remaining capacity E_c of the battery unit 3 at the time of the scheduled arrival at the next charging facility to be equal to or greater than the reference charging capacity E_min. This helps to eliminate the necessity for the user to search for a charging facility every time the charging capacity E_soc of the battery unit 3 decreases during the travel to the destination. In addition, this helps to allow the user to know the minimum charging time at each of the charging facilities to stop, which helps to prevent the staying time at the charging facility from becoming unnecessarily long.

In addition, the minimum necessary charging time T_chg may be proposed, which helps to prevent the battery unit 3 from being in an overdischarge state or an overcharge state during the travel to the destination, and thus to suppress the deterioration of the battery cells.

In some embodiments, the controller 50 may calculate the necessary charging time T_chg, based on: the value E_c of the sum of the expected power consumption amount E_est of the battery unit 3 upon traveling from the charging facility to stop to the next charging facility and the reference charging capacity E_min; the value (E_a) of the charging capacity at the time of the start of the charging at the charging facility; and the data on the charging efficiency of the battery unit 3. This helps to increase a calculation accuracy of the necessary charging time T_chg based on the charging efficiency of the battery unit 3 of each vehicle 1, and to increase an accuracy of the staying time.

In some embodiments, the controller 50 may refer to the travel database in which the traveling data including the traveling sections and the electric power consumption amount is recorded for each of the vehicle types classified based on the performance of the electric power consumption rate of the electric vehicle, and estimate the expected power consumption amount E_est of the battery unit 3, based on the traveling data of the vehicle type that belongs to the same classification as the vehicle type of the vehicle 1. This helps to increase a prediction accuracy of the expected remaining capacity E_c of the battery unit 3 at the time of the scheduled arrival at the next charging facility, and to increase the accuracy of the staying time.

In some embodiments, the controller 50 may set the necessary charging time T_chg to be equal to or greater than the minimum rest time T_rest. This helps to reduce the level of the fatigue of the occupant who rides on the vehicle 1 for a long time even when the charging capacity E_soc of the battery unit 3 is sufficient.

In some embodiments, the controller 50 may propose, together with the traveling route, the charging facility that is closest to the vehicle 1 and different from the charging facility set based on the predetermined criterion, when the charging capacity E_soc of the battery unit 3 is lower than the reference charging capacity E_min. This helps to shorten the time for the vehicle 1 to continue traveling in the overdischarge state of the battery unit 3.

In some embodiments, the controller 50 may reset the charging facilities of the battery unit 3 to stop during the travel to the destination, when the vehicle has stopped at a charging facility that is different from the charging facilities set based on the predetermined criterion. For example, when the vehicle 1 has stopped at the different charging facility, the controller 50 may reset a traveling route that allows for making a brief stop at the charging facilities based on the predetermined criterion with the different charging facility being set as a current location, and execute the process described above.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the above-described example embodiments, the controller mounted on the vehicle has the capabilities of the charging management apparatus or the navigation process. In some embodiments, all or a part of the capabilities of the controller may be provided in an external server communicably coupled via a mobile communicator, and the notification such as the displaying of the traveling route or the proposal on the staying time may be performed based on a signal transmitted from the external server to the vehicle.

According to at least one embodiment of the disclosure, it possible to propose, upon setting a route to a destination, a charging plan that takes into consideration battery charging facilities to stop along the way and the staying time at each of the charging facilities.

The controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 50 illustrated in FIG. 1.

The invention claimed is:

1. A charging management apparatus configured to manage charging of a battery of an electric vehicle serving as a vehicle, the charging management apparatus comprising:

one or more processors; and one or more memories communicably coupled to the one or more processors, wherein the one or more processors are configured to:

acquire data on a current location and a destination of the vehicle;

determine a traveling route between the current location and the destination based on the acquired data;

set first and second charging facilities along the traveling route as planned stops for charging the battery during a travel along the traveling route from the current location to the destination, wherein the second charging facility is scheduled to be stopped at after the first charging facility;

when the vehicle arrives at the first charging facility, estimate an expected remaining capacity of the battery at a scheduled arrival at the second charging facility, by subtracting an expected power consumption amount for traveling from the first charging facility to the second charging facility from a current remaining capacity of the battery, the expected power consumption amount being obtained by summing electric power consumption amounts of a plurality of route sections between the first charging facility and the second charging facility, each route section having associated data reflecting at least one of an uphill load, a downhill load, or regenerative braking along the traveling route;

calculate, at the first charging facility, a necessary charging time such that the expected remaining capacity of the battery, upon a scheduled arrival at the second charging facility, is equal to or greater than a predetermined reference charging capacity;

receive a predetermined minimum rest time, the minimum rest time being a predefined threshold duration set in advance to correspond to a rest break for occupant fatigue recovery at the first charging facility; and set a staying time, at the first charging facility, defined as a duration for which the vehicle remains stopped at the first charging facility, the staying time being determined based on both the calculated charging time and the predetermined minimum rest time, and being set to be equal to or greater than the predetermined minimum rest time when the necessary charging time is shorter than the predetermined minimum rest time.

2. The charging management apparatus according to claim 1, wherein the one or more processors are configured to calculate the necessary charging time, based on: a value of a sum of an expected power consumption amount of the battery upon traveling from the first charging facility to the second charging facility and the predetermined reference charging capacity; a value of a charging capacity upon start of the charging at the first charging facility; and data on a charging efficiency of the battery.

3. The charging management apparatus according to claim 2, wherein the one or more processors are configured to:

refer to a travel database in which traveling data comprising traveling sections and an electric power consumption amount is recorded for a vehicle type of each of electric vehicles, the vehicle type being classified based on a performance of an electric power consumption rate of each of the electric vehicles; and estimate the expected power consumption amount of the battery, based on the traveling data of a corresponding one of the vehicle types that belongs to a same classification as the vehicle type of the vehicle.

4. The charging management apparatus according to claim 1, wherein the one or more processors are configured to reset the first and second charging facilities of the battery to stop during the travel to the destination, when the vehicle has stopped at a charging facility that is different from the first and second charging facilities set based on a predetermined criterion.

5. A navigation system to be applied to an electric vehicle serving as a vehicle, the navigation system comprising:

one or more processors; and one or more memories communicably coupled to the one or more processors, wherein the one or more processors are configured to:

acquire data on a current location and a destination of the vehicle;

determine a traveling route between the current location and the destination based on the acquired data;

set first and second charging facilities along the traveling route as planned stops for charging a battery of the vehicle during a travel along the traveling route from the current location to the destination, wherein the second charging facility is scheduled to be stopped at after the first charging facility;

when the vehicle arrives at the first charging facility, estimate an expected remaining capacity of the battery at a scheduled arrival at the second charging facility, by subtracting an expected power consumption amount for traveling from the first charging facility to the second charging facility from a current remaining capacity of the battery, the expected power consumption amount being obtained by summing electric power consumption amounts of a plurality of route sections between the first charging facility and the second charging facility, each route section having associated data reflecting at least one of an uphill load, a downhill load, or regenerative braking along the traveling route;

calculate, at the first charging facility, a necessary charging time such that the expected remaining capacity of the battery, upon a scheduled arrival at the second charging facility, is equal to or greater than a predetermined reference charging capacity;

receive a predetermined minimum rest time, the minimum rest time being a predefined threshold duration set in advance to correspond to a rest break for occupant fatigue recovery at the first charging facility;

set a staying time, at the first charging facility, defined as a duration for which the vehicle remains stopped at the first charging facility, the staying time being determined based on both the calculated charging time and the predetermined minimum rest time, and being set to be equal to or greater than the predetermined minimum rest time when the necessary charging time is shorter than the predetermined minimum rest time; and present the staying time at the first charging facility.

6. A non-transitory computer readable recording medium containing a computer program to be applied to a charging management apparatus, the charging management apparatus being configured to manage charging of a battery of an electric vehicle serving as a vehicle, the computer program causing, when executed by one or more processors, the one or more processors to implement a method, the method comprising:

acquiring data on a current location and a destination of the vehicle;

determining a traveling route between the current location and the destination based on the acquired data;

setting first and second charging facilities along the traveling route as planned stops for charging the battery during a travel along the traveling route from the current location to the destination, wherein the second charging facility is scheduled to be stopped at after the first charging facility;

when the vehicle arrives at the first charging facility, estimating an expected remaining capacity of the battery at a scheduled arrival at the second charging facility, by subtracting an expected power consumption amount for traveling from the first charging facility to the second charging facility from a current remaining capacity of the battery, the expected power consumption amount being obtained by summing electric power consumption amounts of a plurality of route sections between the first charging facility and the second charging facility, each route section having associated data reflecting at least one of an uphill load, a downhill load, or regenerative braking along the traveling route;

calculating, at the first charging facility, a necessary charging time such that the expected remaining capacity of the battery, upon a scheduled arrival at the second charging facility, is equal to or greater than a predetermined reference charging capacity;

receiving a predetermined minimum rest time, the minimum rest time being a predefined threshold duration set in advance to correspond to a rest break for occupant fatigue recovery at the first charging facility; and setting a staying time, at the first charging facility, defined as a duration for which the vehicle remains stopped at the first charging facility, the staying time being determined based on both the calculated charging time and the predetermined minimum rest time, and being set to be equal to or greater than the predetermined minimum rest time when the necessary charging time is shorter than the predetermined minimum rest time.

* * * * *